Oct. 4, 1932.  E. A. NELSON  1,880,974
RIM CONSTRUCTION
Filed Oct. 29, 1928   2 Sheets-Sheet 1

INVENTOR
Emil A. Nelson
BY
Harness, Dickey & Pierce
ATTORNEYS

Oct. 4, 1932.   E. A. NELSON   1,880,974
RIM CONSTRUCTION
Filed Oct. 29, 1928   2 Sheets-Sheet 2
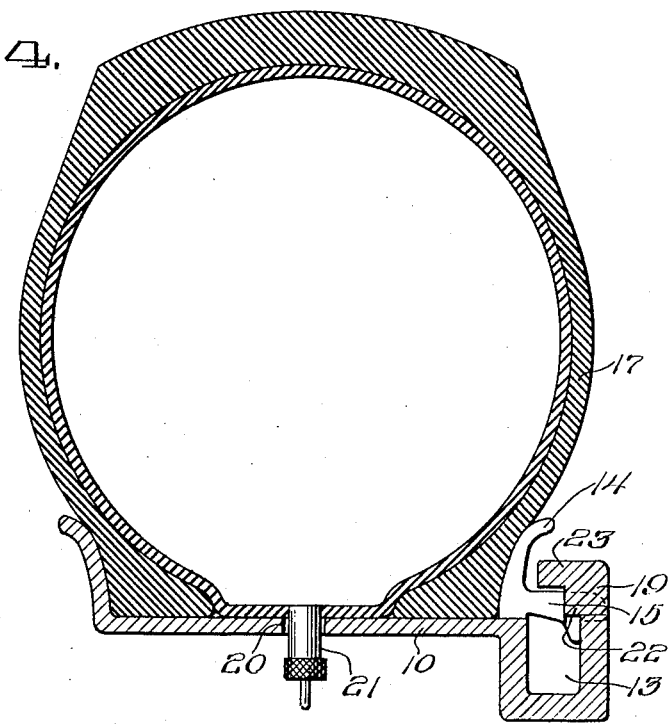
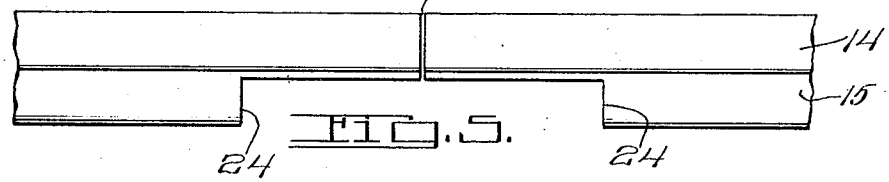
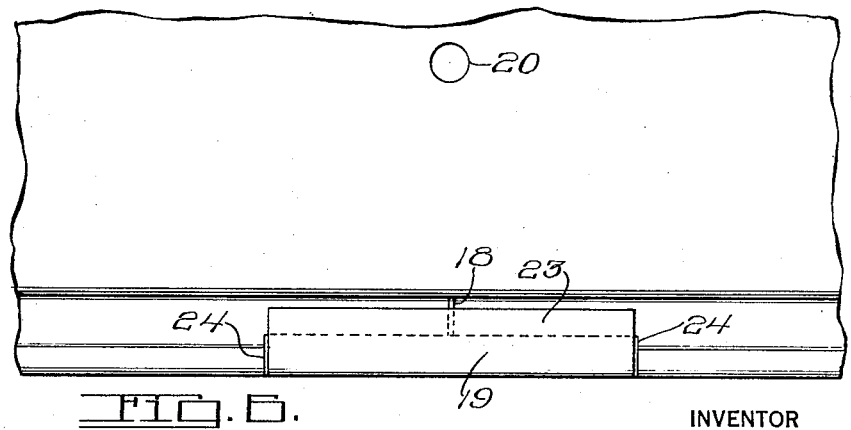
INVENTOR
*Emil A. Nelson*
BY
*Harness, Dickey & Pierce*
ATTORNEYS Patented Oct. 4, 1932

1,880,974

UNITED STATES PATENT OFFICE

EMIL A. NELSON, OF DETROIT, MICHIGAN

RIM CONSTRUCTION

Application filed October 29, 1928. Serial No. 315,848.

This invention relates to a construction for rims of the type employed in connection with the wheels of motor vehicles and particularly to those types employing a removable split flange ring, the principal object being the provision of means for locking the flange ring to the rim in such a manner that removal of the ring is made impossible while the co-operating tire remains inflated.

Another object is to provide means for positively locking the split flange ring of a tire rim against movement relative to the rim, either radially or circumferentially, while the tire remains inflated.

A further object is to provide a new and novel means for preventing displacement of a split flange ring on a tire rim during service, and which will be simple in design, economical to manufacture, and efficient in use.

The above being among the objects of the present invention, the same consists of certain features of construction and combinations of parts to be hereinafter described with reference to the accompanying drawings, and then claimed, having the above and other objects in view.

In the accompanying drawings which illustrate suitable embodiments of the present invention, in which like numerals refer to like parts throughout the several different views:

Fig. 4 is an enlarged sectional view taken as on the line 4—4 of Fig. 1 and illustrating the relation of a tire thereto.

Fig. 5 is a fragmentary edge view of the split flange ring at the point of split, showing the manner in which it is cut away to co-operate with the locking member.

Fig. 6 is a fragmentary plan view of the rim and co-operating split flange ring showing the manner in which the locking member co-operates with the split flange ring.

Figure 1:
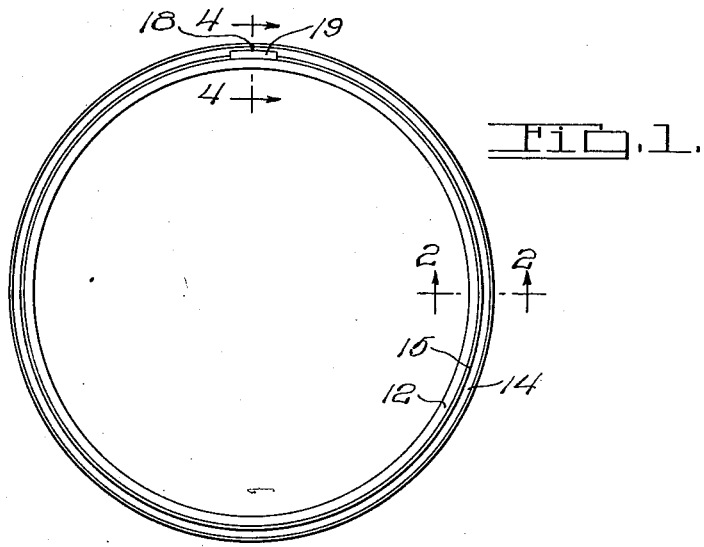
Fig. 1 is a side view of a vehicle rim provided with a split flange ring locked in place in accordance with the present invention.

It is a known fact in connection with demountable rims for pneumatic tires employing the conventional type of split flange rings, and particularly where such rims are employed with the large size of tires and high pressures generally met with in bus or truck service, that the split flange rings are sometimes forced off of the rim during service and while the tire remains inflated. The disastrous results that are liable to attend the displacement of the flange ring during service is readily recognized by those skilled in the art.

In my application for Letters Patent of the United States for improvements in wheel and rim construction, filed July 12th, 1928, and serially numbered 292,281, I described a novel type of flange ring construction designed to minimize inadvertent displacement of the flange ring on the rim during service, and I also provided a novel form of locking means for such type of flange rings. This locking means is also adapted to the conventional types of construction.

The present invention relates to another form of locking means for preventing displacement of the split flange ring on the rim during service. In the following description and in the accompanying drawings, a form of the present invention is disclosed which is particularly applicable to the larger and heavier types of flange ring and rim constructions such as are used in connection with trucks and busses where the centrifugal force acting on the flange rings is of minor importance. Typically, each rim may include a lateral trough whose parallel flanges radially terminate in substantially parallel and concentric but axially "inner" and "outer" cylindrical surfaces, spaced apart by the recess of said trough, for engagement by like surfaces upon a split ring,—the mentioned outer cylindrical surface being provided by a flange which provides also a substantially flat abutment surface perpendicular to the axis of the rim; and the co-operating split ring may include not only a flanged head portion, for engagement by a tire and in axially slidable engagement with the mentioned inner cylindrical surface, but also a foot portion in the form of an angle element shaped to engage both of the mentioned surfaces provided by the mentioned flange. This flange will be seen to constitute an outer wall of the mentioned trough; and, said head portion and foot portion being interconnected by a substantially cylindrical web or shank portion, said foot portion may, in all cases, be cut away to provide reduced end portions adjacent the split in said ring; and the mentioned outer trough wall or flange may in all cases be provided, opposite said cut-away end portion, with means, such as an angle-section keeper, including a substantially cylindrical flange adapted normally to overlie the cylindrical surface of said shank,—thereby rendering a separation of the ends of said ring possible only upon the completion of an axially inward movement thereof, and providing oppositely facing surfaces perpendicular to the rim axis and serving as stops engageable by the like surfaces which terminate said reduced end portions.

Figure 2:
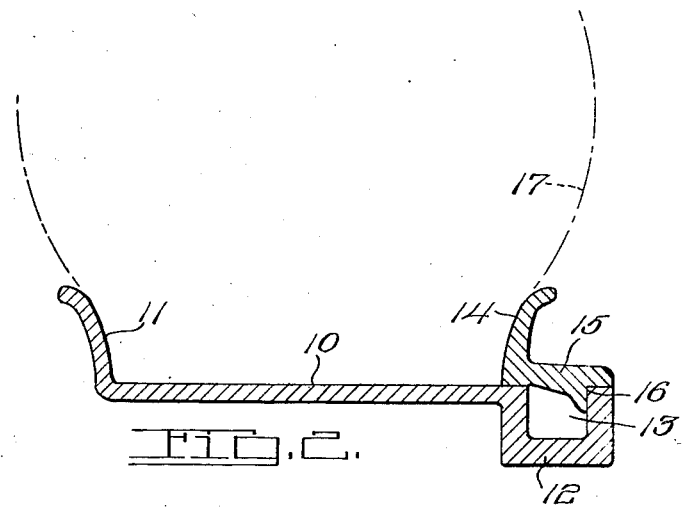
Fig. 2 is an enlarged sectional view taken on the line 2—2 of Fig. 1.

Referring to the accompanying drawings, Figs. 1 to 6 inclusive refer to a type of construction such as is particularly applicable for use in connection with trucks and busses, although it is to be understood that it is not limited to such vehicles. Referring to Figs. 1 and 2 I show a rim of the demountable type having a base 10 and a side flange 11 which may be permanently attached as shown, or may be removable as in the case of the conventional "B" types of rims commercially used on a relatively large scale. The opposite side of the rim is formed in accordance with my previous patent application above referred to, and as in that construction, is provided with an enlarged annular edge portion 12 internally recessed as at 13. The split flange ring employed in the present case is in general the same as that shown and described in my previous patent application referred to, and comprises a split ring formed to provide an inner upwardly and outwardly extending flange portion 14 and a base portion 15 which bridges the recess 13 and is provided with a relatively shallow radially inwardly extending shoulder 16 which is adapted to bear against the outer side wall of the recess 13. In this construction the resultant line of pressure of the tire 17 acting on the flange ring is transmitted from the flange 14 through the base 15 between the inner and outer edges thereof so as to eliminate the tendency of the tire pressure to twist the flange ring out of the recess 13. The flange ring is split as at 18.

The locking means for the flange ring in the present case is best shown in Figs. 3 to 6 inclusive. As indicated in these figures, a locking member indicated generally as at 19 is welded or otherwise secured to the upper face of that portion of the enlarged annular portion 12 of the rim positioned outwardly of the recess 13. The member 19 is preferably equally disposed circumferentially of the rim on either side of the opening 20 in the base 10 through which the valve stem 21 is adapted to project. The member 19 extends radially outwardly of the plane of the base 10 and preferably projects axially inwardly of the outer wall of the recess 13 a slight distance as at 22 in Fig. 4. The member 19 is also provided with an inwardly extending interlocking flange portion 23. The flange ring itself on either side of the line of split 18 has the base portion 15 thereof cut away as at 24 on either side of the line of split 18 and for a depth corresponding to the cross sectional thickness or width of the member 19 below the flange 23. The lower face of the flange 23 is positioned above the outer face of the base 10 a sufficient distance so as to permit the co-operating portion of the base portion 15 in the neighborhood of the cut away portion 24 to fit thereunder.

Figure 3:
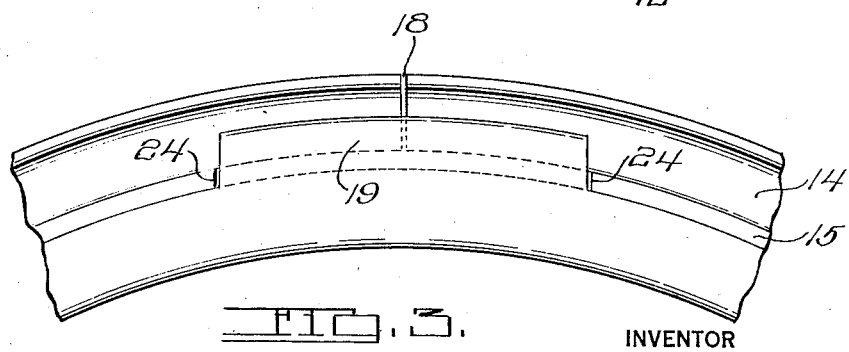
Fig. 3 is an enlarged fragmentary side view of the rim shown in Fig. 1 at the point where the locking member co-operates therewith.

When assembled, the flange ring is positioned on the rim as indicated in Fig. 2 with the cut out portions 24 fitted around the member 19, and with the portion 23 overlying the line of split of the co-operating portion 15 of the flange ring as indicated in Figs. 3, 4 and 6.

It will be apparent that when the tire 17 is inflated the pressure of the tire acting on the free ends of the split flange ring will maintain the ends of the flange ring under the overhanging flange 23 so that it will be impossible to spring the free ends of the split flange ring radially outwardly of the recess 13 until the flange ring has been moved inwardly of the rim a sufficient distance to bring the free ends thereof out from under the flange portion 23, and it will also be evident that as long as the tire 17 remains inflated the pressure of the tire acting on the flange ring will effectually prevent such inward displacement of the free ends of the flange ring. It will therefore be necessary, in order to remove the split flange ring, to first deflate the tire 17 and then force one of the free ends of the split flange ring axially inwardly until it clears the overhanging flange portion 23 of the locking member 19, after which it may be sprung radially outwardly and thereupon be moved axially outwardly of the groove 13 to enable the split flange ring to be removed from the rim.

It will also be apparent that inasmuch as the base portion 15 of the split flange ring is cut out at 24 to fit around the member 19, the end walls of the cut away portion 24, in co-operating with the member 19, will prevent relative circumferential movement of the split flange ring with respect to the rim, and will therefore prevent the free ends of the split flange ring from moving circumferentially out of proper alignment with the member 19. The member 19 will of course be positioned axially of the rim in alignment with the opening 20 for the valve stem 21, so that upon removal of the split flange ring the tire 17 may first be swung off of the rim opposite the opening 20 so as to permit the tire in the neighborhood of the opening 20 to be thereafter lifted up over the member 19 in removing the tire from the rim, for if the opening 20 and the member 19 were not in alignment they otherwise might co-operate to prevent the tire from being removed from the rim.

It will be obvious from the above that the locking means which I have herein provided offers a simple and effective method of locking the split flange ring against displacement on a tire rim, and that such construction is economical to manufacture.

Although I have shown but one specific embodiment of the present invention, it will be apparent that the present invention may be modified by persons skilled in the art to co-operate with any desired form of split flange ring and rim construction, and formal changes may be made in the specific embodiment of the invention described without departing from the spirit or substance of the broad invention, the scope of which is commensurate with the appended claims.

I claim:

1. A vehicle wheel assembly comprising a rim base portion, a gutter formed about the outer periphery of said rim base portion adjacent to one edge thereof, a segment of the axially outer wall of the gutter being shaped into a radially outwardly and axially inwardly directed hook-like portion, a trans-split ring having a tire bead retaining flange and an approximately cylindrical ring base portion completely bridging the gutter and having a radially inwardly projecting portion engaging the outer wall of the gutter to prevent axially outward displacement of the ring but being so proportioned as to permit a considerable degree of movement in the axially inward direction, the marginal portions of the ring base portion being adapted to slide upon the rim base portion, the axially outer edge of the ends of the ring base portion being notched to engage the ends of the hook-like portion to prevent circumferential creeping of the ring, the ring base portion further having portions adapted to underlie the hook portion normally to prevent radial displacement of the ring while a tire upon the rim is inflated.

2. A vehicle wheel assembly comprising a rim base portion, a gutter formed about the outer periphery of said rim base portion adjacent to one edge thereof, a segment of the axially outer wall of the gutter being shaped into a radially outwardly and axially inwardly directed hook-like portion, a trans-split ring having a tire bead retaining flange and an approximately cylindrical ring base portion completely bridging the gutter and having a radially inwardly projecting portion engaging the outer wall of the gutter to prevent axially outward displacement of the ring but being so proportioned as to permit a considerable degree of movement in the axially inward direction, the marginal portions of the ring base portion being adapted to slide upon the edges of the gutter, the axially outer edges of the ends of the ring base portion being notched to engage the ends of the hook-like portion to prevent circumferential creeping of the ring, the ring base portion further having portions adapted to underlie the hook portion normally to prevent radial displacement of the ring while a tire upon the rim is inflated, said rim base portion having a valve hole formed therein at a point substantially adjacent to the split in said ring.

EMIL A. NELSON.